(12) United States Patent
Weisse

(10) Patent No.: US 10,570,917 B2
(45) Date of Patent: Feb. 25, 2020

(54) FAN BLADE WITH COMPOSITE COVER

(71) Applicant: UNITED TECHNOLOGIES CORPORATION, Farmington, CT (US)

(72) Inventor: Michael A. Weisse, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 786 days.

(21) Appl. No.: 15/225,448

(22) Filed: Aug. 1, 2016

(65) Prior Publication Data
US 2018/0030995 A1 Feb. 1, 2018

(51) Int. Cl.
*F04D 29/32* (2006.01)
*F01D 9/04* (2006.01)
(Continued)

(52) U.S. Cl.
CPC .......... *F04D 29/325* (2013.01); *F01D 9/041* (2013.01); *F01D 25/005* (2013.01);
(Continued)

(58) Field of Classification Search
CPC .......... F01D 5/147; F01D 5/282; F01D 9/041; F01D 25/005; F02K 3/06; F04D 29/324; F04D 29/325; F04D 29/388; F05B 2240/30; F05B 2240/302; F05B 2280/1021; F05B 2280/10304; F05B 2280/6003; F05D 2220/36; F05D 2230/60; F05D 2240/12; F05D 2240/30; F05D 2240/305;
(Continued)

(56) References Cited

U.S. PATENT DOCUMENTS 4,118,147 A * 10/1978 Ellis .................. B23P 6/005
416/224
5,141,400 A * 8/1992 Murphy ............. B29C 43/18
416/204 A (Continued)

FOREIGN PATENT DOCUMENTS

| DE | 102013219772 | 4/2015 |
| WO | 2015105545 | 7/2015 |

OTHER PUBLICATIONS

Extended European Search Report, dated Dec. 6, 2017 in European Application No. 17182037.6.

*Primary Examiner* — Woody A Lee, Jr.
*Assistant Examiner* — Christopher R Legendre
(74) *Attorney, Agent, or Firm* — Snell & Wilmer, L.L.P.

(57) ABSTRACT

A fan blade includes a metallic body, a first composite cover, and a second composite cover. The metallic body may have a first side, a second side, a plurality of first retention slots, and a plurality of second retention slots, in accordance with various embodiments. The first and second retention slots may extend from the first side to the second side of the metallic body. The first composite cover may be coupled to the first side of the metallic body and may include a plurality of first fingers that extend through the first retention slots and are coupled to the second side of the metallic body. The second composite cover may be coupled to the second side of the metallic body and may include a plurality of second fingers that extend through the second retention slots and are coupled to the first side of the metallic body.

15 Claims, 6 Drawing Sheets

(51) Int. Cl.
  *F01D 25/00* (2006.01)
  *F04D 29/02* (2006.01)
  *F04D 29/38* (2006.01)

(52) U.S. Cl.
  CPC ......... *F04D 29/023* (2013.01); *F04D 29/388* (2013.01); *F05B 2240/302* (2013.01); *F05B 2280/1021* (2013.01); *F05B 2280/10304* (2013.01); *F05B 2280/6003* (2013.01); *F05D 2220/36* (2013.01); *F05D 2230/60* (2013.01); *F05D 2240/12* (2013.01); *F05D 2240/30* (2013.01); *F05D 2300/173* (2013.01); *F05D 2300/174* (2013.01); *F05D 2300/603* (2013.01)

(58) Field of Classification Search
  CPC ........... F05D 2240/306; F05D 2260/36; F05D 2300/133; F05D 2300/173; F05D 2300/174; F05D 2300/603
  See application file for complete search history.

(56) References Cited

U.S. PATENT DOCUMENTS

| | | | | |
|---|---|---|---|---|
| 5,314,282 A * | 5/1994 | Murphy | ................ | B29C 53/562 244/132 |
| 6,979,180 B2 * | 12/2005 | Motherwell | ............ | F01D 5/147 416/229 R |
| 7,156,622 B2 * | 1/2007 | Schreiber | ................ | B23P 15/04 416/224 |
| 8,033,789 B2 * | 10/2011 | Read | ......................... | F01D 5/26 416/230 |
| 8,038,408 B2 * | 10/2011 | McMillan | ............ | B29C 70/222 416/230 |
| 8,109,734 B2 * | 2/2012 | Backhouse | ............. | F01D 5/147 244/123.1 |
| 8,585,368 B2 * | 11/2013 | Viens | ...................... | F01D 5/147 416/191 |
| 9,664,201 B2 * | 5/2017 | Dudon | .................... | B23P 15/04 |
| 10,215,027 B2 * | 2/2019 | Schwarz | ................... | F01D 5/16 |
| 2012/0237351 A1 * | 9/2012 | Weisse | .................... | B64C 11/24 416/220 R |
| 2013/0039774 A1 | 2/2013 | Viens et al. | | |
| 2013/0052004 A1 * | 2/2013 | Stilin | ...................... | F01D 9/042 415/211.2 |
| 2014/0219805 A1 * | 8/2014 | Lamboy | ................ | F01D 5/3007 416/219 R |
| 2015/0132142 A1 * | 5/2015 | Weisse | .................... | F01D 5/147 416/229 R |
| 2015/0198173 A1 * | 7/2015 | Weisse | .................. | F04D 29/324 416/229 R |
| 2016/0215789 A1 * | 7/2016 | Hui | ....................... | F04D 29/023 |
| 2018/0030995 A1 * | 2/2018 | Weisse | .................. | F04D 29/325 |

* cited by examiner

FAN BLADE WITH COMPOSITE COVER

FIELD

The present disclosure relates to gas turbine engines, and more specifically, to metal fan blades in gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The fan section, compressor section, and turbine section typically include a series of rotor systems. Rotor systems typically include a disk and a plurality of circumferentially spaced blades, such as fan blades. The properties of a fan blade, such as the strength, stiffness, density, etc., are factors that contribute to the performance, lifecycle, safety, and reliability of a gas turbine engine.

SUMMARY

In various embodiments, the present disclosure provides a fan blade that may include a metallic body, a first composite cover, and a second composite cover. The metallic body may have a first side, a second side, a plurality of first retention slots, and a plurality of second retention slots, in accordance with various embodiments. The first and second retention slots may extend from the first side to the second side of the metallic body. The first composite cover may be coupled to the first side of the metallic body, wherein the first composite cover includes a plurality of first fingers that extend through the first retention slots and are coupled to the second side of the metallic body. The second composite cover may be coupled to the second side of the metallic body, wherein the second composite cover includes a plurality of second fingers that extend through the second retention slots and are coupled to the first side of the metallic body.

In various embodiments, the metallic body is made from titanium. In various embodiments, the first and second composite covers are made from a graphite epoxy material. In various embodiments, the first composite cover is made from a first composite material and the second composite cover is made from a second composite material that is different than the first composite material. The first side of the metallic body may be concave and the second side of the metallic body may be convex. In various embodiments, the first composite cover and the second fingers form a continuous pressure surface of the fan blade and the second composite cover and the first fingers form a continuous suction surface of the fan blade.

In various embodiments, a leading edge, a trailing edge, and a tip of the fan blade are uncovered with the first and second composite covers. In various embodiments, the first and second retention slots collectively form a series of leading edge slots and a series of trailing edge slots, wherein the leading edge slots are disposed between a central axis of the fan blade and a leading edge of the fan blade and the trailing edge slots are disposed between the central axis of the fan blade and a trailing edge of the fan blade. The leading edge slots may alternate between the first and second slots and the trailing edge slots may alternate between the first and second slots. In various embodiments, the leading edge slots may be positioned to follow a shape of the leading edge and the trailing edge slots may be positioned to follow a shape of the trailing edge. The fan blade may further include intermediate slots disposed between the leading edge slots and the trailing edge slots.

Also disclosed herein, according to various embodiments, is a gas turbine engine having a fan section that includes a plurality of fan blades. In various embodiments, a fan blade of the plurality of fan blades may have a metallic body having retention slots and a composite cover coupled to the metallic body via the retention slots. In various embodiments, the metallic body of the fan blade has a concave side and a convex side, wherein the composite cover includes a concave composite cover and a convex composite cover. The concave composite cover may be coupled to the concave side of the metallic body and the convex composite cover may be coupled to the convex side of the metallic body.

In various embodiments, the gas turbine engine further includes a second fan blade that is free of shroud elements. In various embodiments, the fan section includes a guide vane strut extending between a fan section casing and a central longitudinal core of the gas turbine engine, wherein the guide vane strut includes a metallic body having retention slots and composite covers coupled to the metallic body via the retention slots. In various embodiments, the metallic body of the fan blade is made from titanium and/or the composite cover of the fan blade is made from a graphite epoxy material.

Also disclosed herein, according to various embodiments is a method of manufacturing a fan blade. The method may include forming a metallic body of the fan blade having a plurality of first and second retention slots, coupling a first composite cover to a first side of the metallic body such that a plurality of first fingers of the first composite cover extend through the first retention slots, and coupling a second composite cover to a second side of the metallic body such that a plurality of second fingers of the second composite cover extend through the second retention slots.

In various embodiments, coupling the first composite cover to the first side of the metallic body and coupling the second composite cover to the second side of the metallic body includes adhesive bonding. In various embodiments, the first composite cover and the second composite cover include plies of uncured material, wherein coupling the first composite cover to the first side of the metallic body and coupling the second composite cover to the second side of the metallic body includes curing the plies. In various embodiments, the first composite cover and the second composite cover are fully cured independently.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
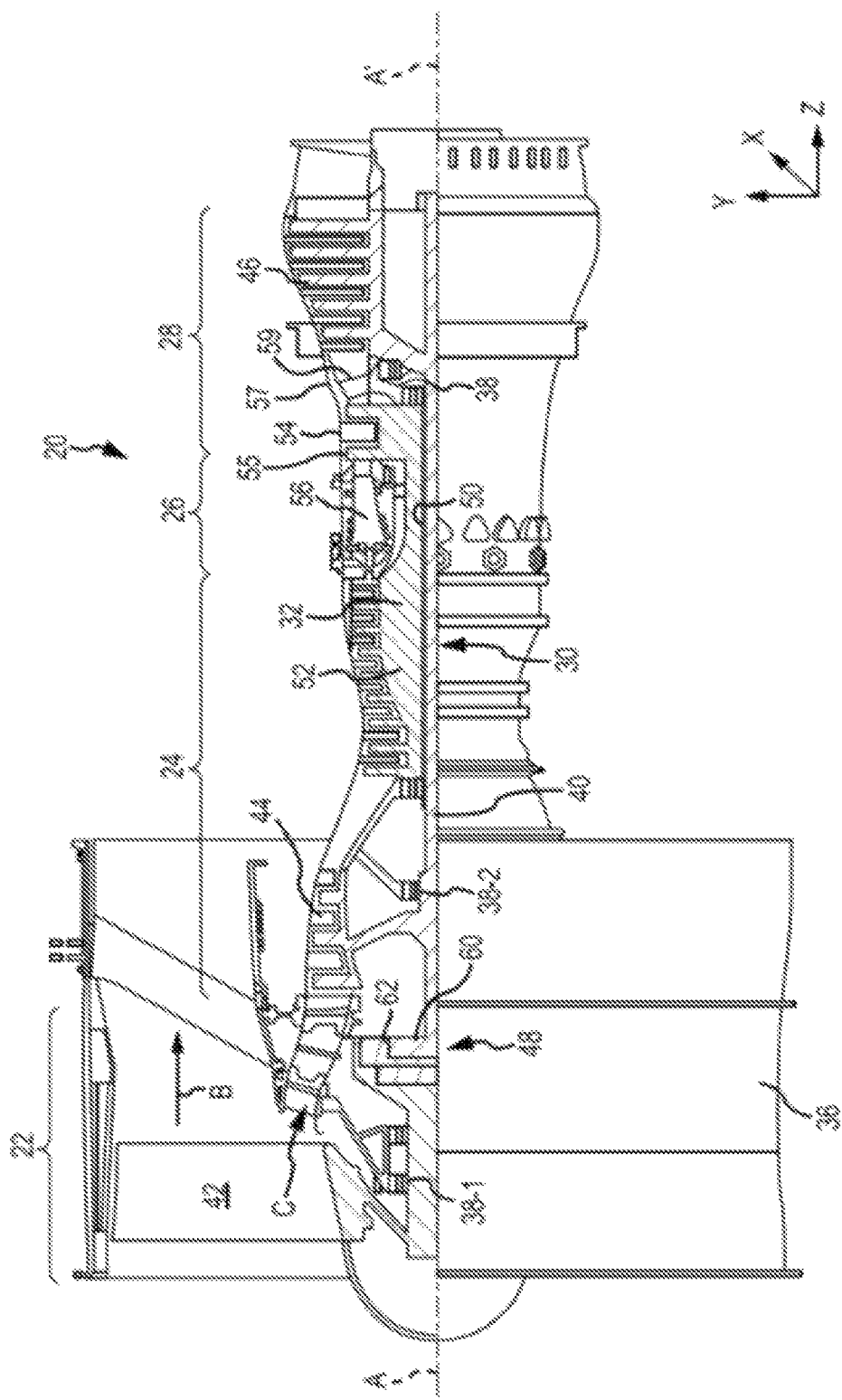
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a fan blade having a composite cover is disclosed herein. While the term "fan blade" is used herein, the details of the present disclosure may be implemented in conjunction with turbine blades, compressor blades, vanes, struts, or other similar components of a gas turbine engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

The fan section 22, the compressor section 24 and the turbine section 28 may each comprise rotor systems including blade assemblies having one or more sets of rotating blades, which may rotate about engine central longitudinal axis A-A'. In a turbofan engine, lighter components generally lead to more efficient performance. If less energy is expended moving internal engine parts, more energy is available for useful work. At the same time, the components themselves must be strong enough to withstand forces typical for the operating environment and performance envelope. For example, fan blades may encounter bird strikes during flight and the operability of the gas turbine engine may be compromised if the fan blades are broken or otherwise damaged. Accordingly, as mentioned above, the present disclosure provides a fan blade having a composite cover that can withstand bird strikes and other occurrences.

Figure 2:
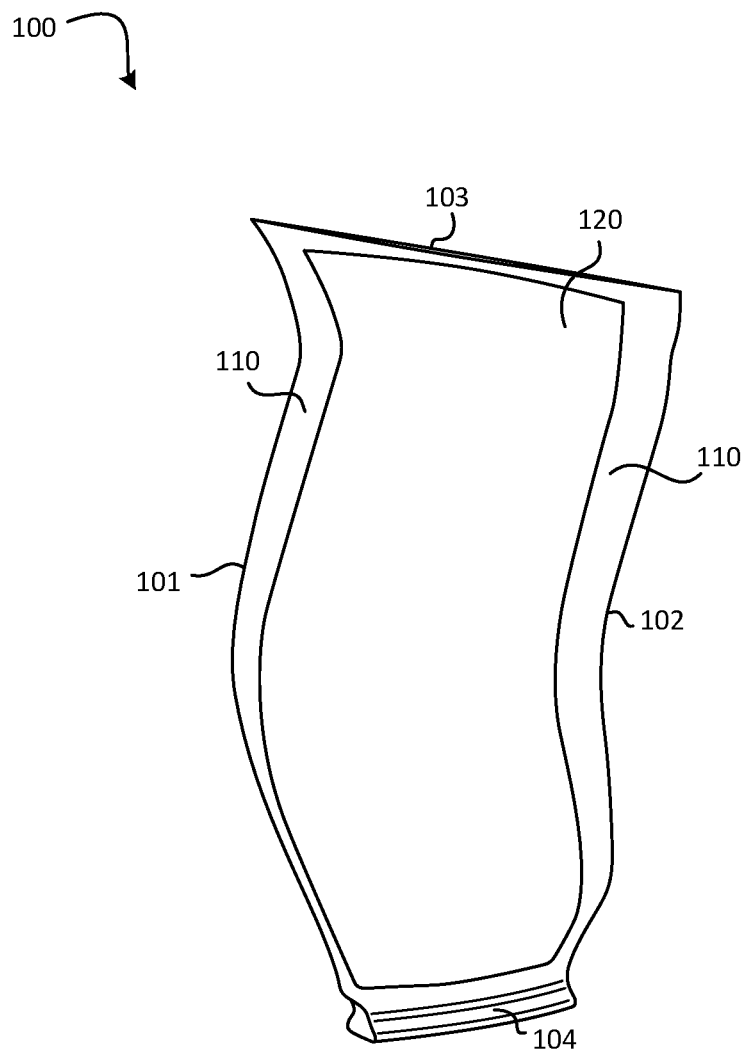
FIG. 2 illustrates a perspective view of a fan blade, in accordance with various embodiments.

With reference to FIGS. 2-5C, various views of a fan blade are shown, with certain components removed, in accordance with various embodiments. More specifically, FIG. 2 illustrates a perspective view of a fan blade 100 having a metallic body 110 and a composite cover 120. The fan blade 100 may include a hub end 104 for attaching the fan blade 100 to a disk of a rotor system. The fan blade 100 may also have a radially outer edge or tip 103 located radially outward from the hub end 104. The fan blade 100 may have a leading edge 101 opposite a trailing edge 102. In various embodiments, the fan blade 100 may further include a generally concave pressure surface 106 (FIG. 5A-5C) and a generally convex suction surface 107 (FIG. 5A-5C) joined together at the respective leading edge 101 and trailing edge 102. The fan blade 100 may be curved and twisted relative to, for example, a plane extending radially from the disk, in terms of the overall geometry of the fan blade 100.

It will be noted that fan blades for gas turbine engines may be provided in the variety of sizes, shapes and geometries. Accordingly, the fan blade 100 of the present disclosure is not limited to the specific geometry, size, and shape shown in the figures. Further, as mentioned above, the disclosed fan blade 100 is not necessarily limited to the fan section 22 of a gas turbine engine 20, but instead may be implemented in other sections of the gas turbine engine 20 and/or may be adapted for use in other types of jet engines, propellers, rotors, etc.

With reference to FIG. 2-5C, and as described in greater detail below, the metallic body 110 of the fan blade 100 may be fabricated from titanium, titanium alloy, aluminum, or aluminum alloy, among other suitable metallic materials, in accordance with various embodiments. The metallic body 110 may have a first side 116 and a second side 117. The first side 116, for example, may have a concave shape, relative to a blade plane that extends through the leading edge 101 and the trailing edge 102 and that is parallel with a central axis 105 of the fan blade 100, in accordance with various embodiments. In various embodiments, the second side 117, for example, may have a convex shape, relative to the blade plane that extends through the leading edge 101 and the trailing edge 102 and that is parallel with the central axis 105 of the fan blade 100, in accordance with various embodiments.

The composite cover 120, according to various embodiments, may comprise any composite material such as carbon fiber, fiber-reinforced polymer (e.g., fiber glass), para-aramid fiber, and/or aramid fiber. In various embodiments, the composite cover 120 may be made from a fiber metal laminate ("FML"). For example, the composite cover 120 may include metal layers comprising titanium and/or a titanium alloy and the composite material layers in the FML may comprise carbon fiber, such as graphite fiber. The combination of a metal layer comprising titanium and a composite material layer comprising carbon fiber may occur because titanium and carbon fiber do not form a galvanic cell, and therefore, galvanic corrosion may not occur. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. The combination of a metal layer comprising aluminum and a composite material layer comprising fiber glass and/or aramid fiber may occur because aluminum and fiber glass and/or aramid fiber do not form a galvanic cell, and therefore, galvanic corrosion may not occur. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers and/or stacks of FML layers may be coupled together using an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

In various embodiments, the metallic body 110 imparts mechanical strength to the fan blade 100 and the composite cover 120 imparts stiffness to the fan blade 100 and reduces the overall weight of the fan blade 100. The stiffness of the fan blade 100 may be such that adjacent fan blades are prevented from striking each other and/or that detrimental vibratory frequencies are "tuned-out," in accordance with various embodiments. Accordingly, a rotor assembly including the fan blades 100 may be free of shroud elements disposed between adjacent fan blades.

The composite cover 120 may be coupled to and conform to the first and second sides 116, 117 of the metallic body 110. In various embodiments, the composite cover 120 may be attached to the first and second sides 116, 117 of the metallic body 110 using adhesive materials. For example, a urethane-based adhesive, polyurethane-based adhesive, epoxy-based adhesive, epoxy film, rubber adhesive or other suitable adhesive may be applied to the first and/or second sides 116, 117 of the metallic body or to the composite comber 120. In various embodiments, heat and pressure may be applied to cure the adhesive. In various embodiments, as described in greater detail below with reference to FIG. 6, the composite cover 120 may include uncured polymer plies and the step of coupling the composite cover 120 to the metallic body 110 includes infusing the polymer plies with resin and curing the matrix.

In various embodiments, the composite cover 120 may not extend across the entire side 116, 117 of the metallic body 110. Said differently, fan blade 100 may have portions of the metallic body 110 that are left uncovered by the composite cover 120, in accordance with various embodiments. For example, the leading edge 101, the trailing edge 102, the tip 103, and the hub end 104 of the fan blade 100 may be free of the composite cover 120. In various embodiments, the dimensions of the metallic body 110 and/or the composite cover 120 may be adjusted and/or "tuned" according to desired operating conditions, such as blade frequencies, of the gas turbine engine. Additional details relating to the composite cover 120 are included below with reference to FIG. 4-5C.

Figure 3:
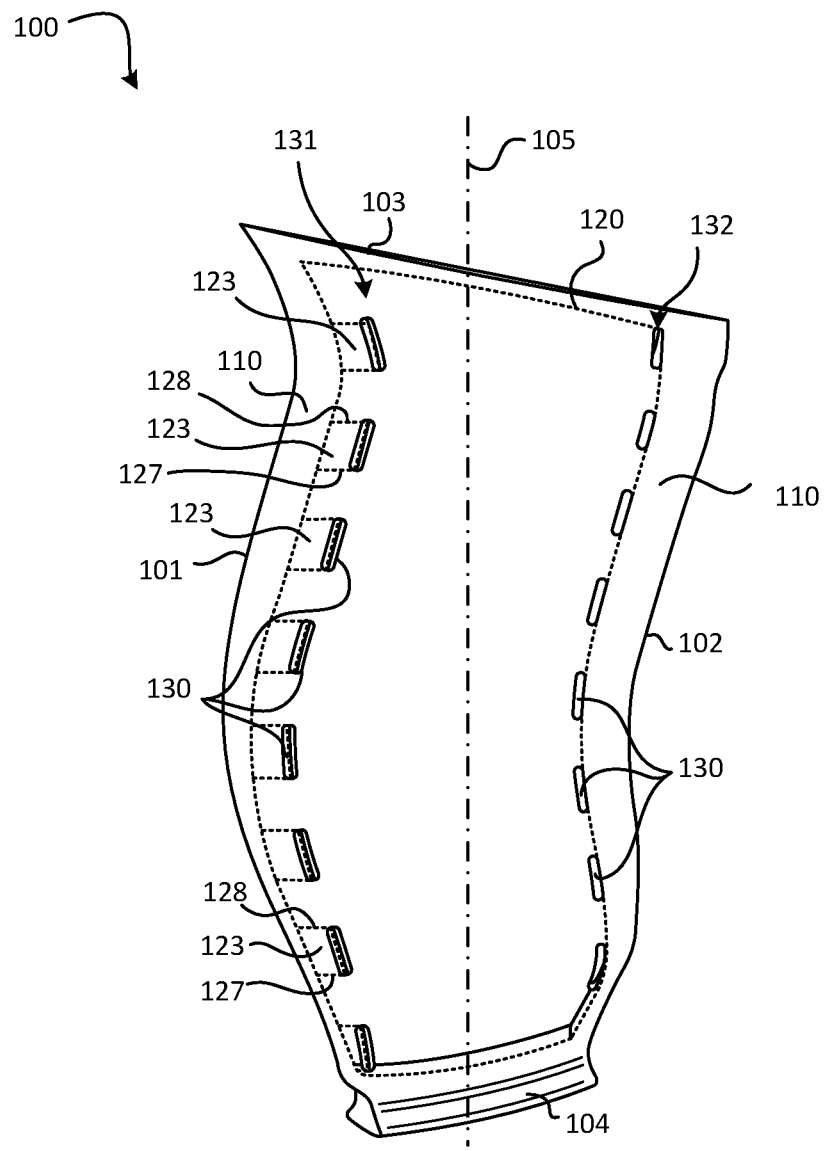
FIG. 3 illustrates another perspective view of the fan blade of FIG. 2, in accordance with various embodiments.

With reference to FIG. 3, the fan blade 100 is shown in additional detail, with the composite cover 120 shown as transparent in order to view the underlying structure, in accordance with various embodiments. The metallic body 110 of the fan blade 100 may include a plurality of retention slots 130 that extend completely through the metallic body 110 of the fan blade. For example, the retention slots 130 may extend from the first side 116 (e.g., a concave side) of the metallic body 110 to the second side 117 (e.g., a convex side) of the metallic body 110. A plurality of fingers 123, as described in greater detail below with reference to FIG. 5A-5C, may extend through the retention slots 130, in accordance with various embodiments, to facilitate the strength of the bond between the metallic body 110 and the composite cover 120. In various embodiments, radially outward edges 128 and radially inward edges 127 of the fingers 123 may be parallel with each other to facilitate assembly of the fan blade 100. In various embodiments, the radially outward edges 128 and the radially inward edges 127 of the fingers 123 may be parallel with the engine central longitudinal axis A-A' of the gas turbine engine.

In various embodiments, the retention slots 130 may be arranged in a series of leading edge slots 131 and a series of trailing edge slots 132. Said differently, the leading edge slots 131 may be disposed between a central axis 105 of the fan blade 100 and the leading edge 101 of the fan blade 100 and the trailing edge slots 132 may be disposed between the central axis 105 of the fan blade 100 and the trailing edge 102 of the fan blade 100, according to various embodiments. The retention slots 130 may be positioned to follow a shape of the leading edge 101 and the trailing edge 102. In various embodiments, the retention slots 130 may be elongated and the opening of the retention slots may be obround or racetrack shaped, ovular, round, or square, among other shapes. In various embodiments, the distribution, number, shape, alignment, and overall configuration of the retention slots 130 may be tailored for a specific application. For example, the leading edge retention slots 131 and the trailing edge retention slots 132, respectively, may be uniformly spaced apart from each other, in accordance with various embodiments.

Figure 4:
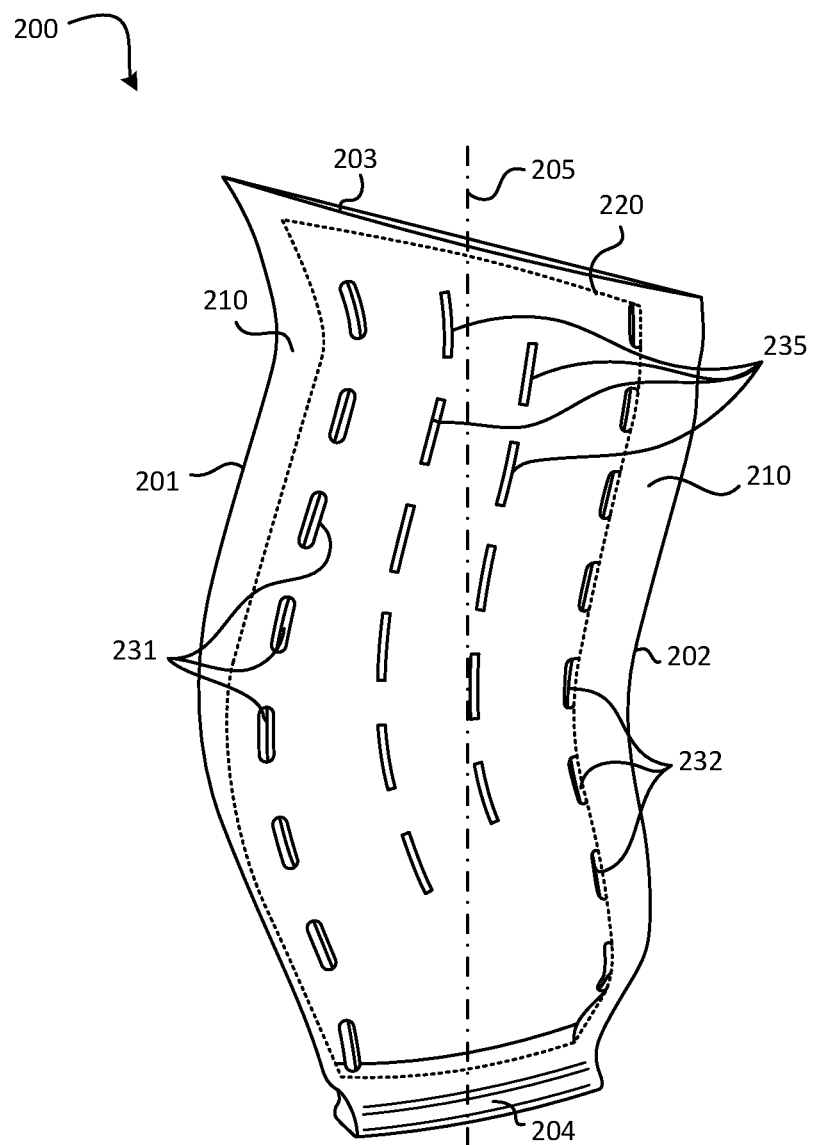
FIG. 4 illustrates a perspective view of a fan blade, in accordance with various embodiments.

With reference to FIG. 4, and in accordance with various embodiments, the fan blade 200 may also have intermediate slots 235 disposed between the leading edge slots 231 and the trailing edge slots 232. Throughout the present disclosure, like reference numbers refer to like elements. For example, leading edge 201, trailing edge 202, tip 203, hub end 204, longitudinal axis 205, metallic body 210, composite cover 220, and the retention slots 231, 232 may be similar to the like-numbered and same-named components of FIGS. 2, 3, and 5A-5C. The intermediate slots 235 may further facilitate and improve the connection between the composite cover 220 and the metallic body 210 by increasing the interconnectivity of the composite component 120 with the metallic body 210. Also, the presence of the intermediate slots 235 may further reduce the weight of the fan blade 200, in accordance with various embodiments.

Figure 5A:
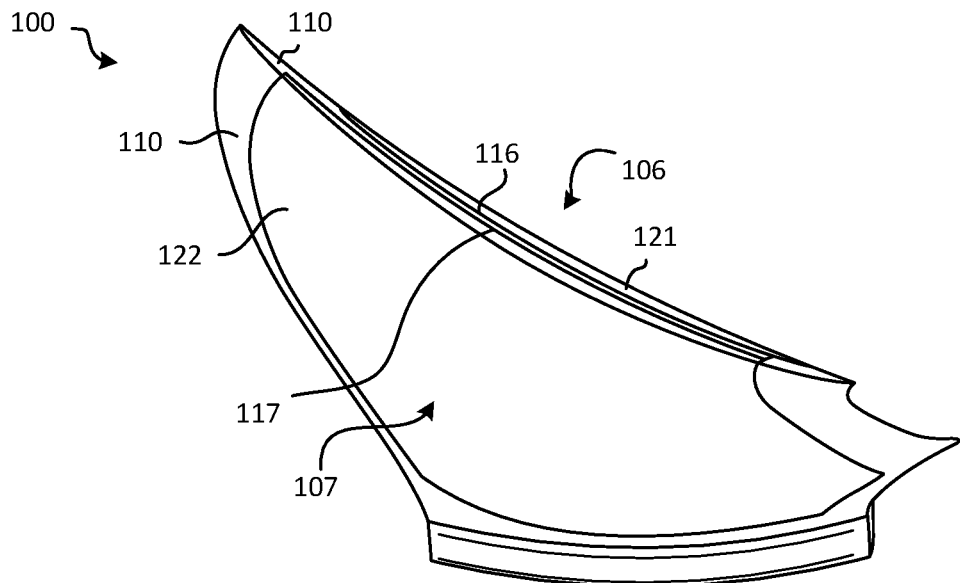
FIG. 5A illustrates a perspective cross-sectional view of a fan blade, in accordance with various embodiments.
Figure 5B:
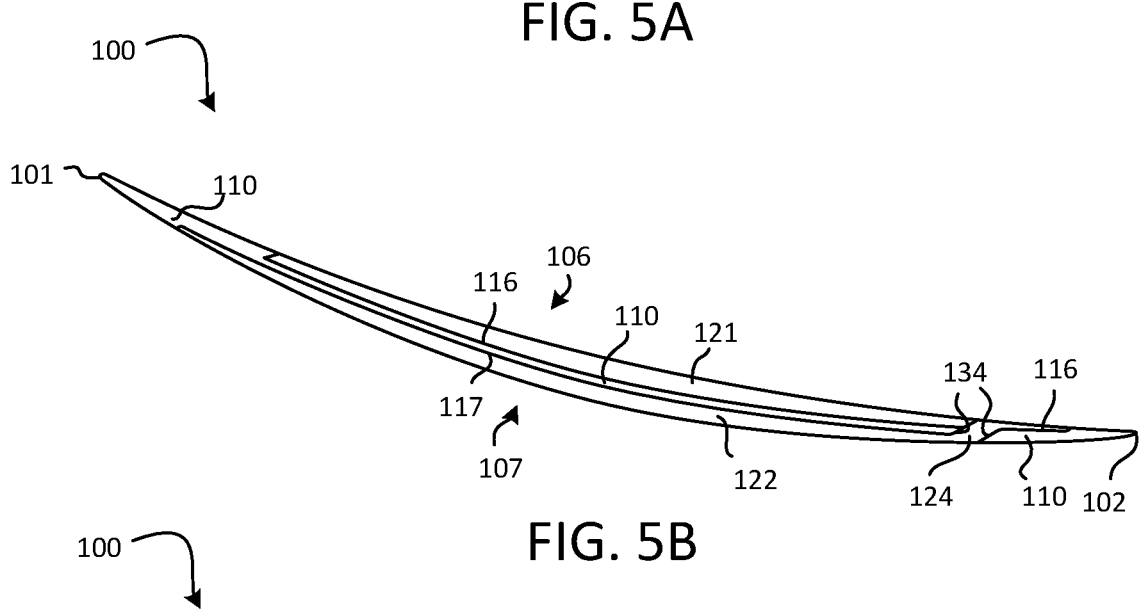
FIG. 5B illustrates a cross-sectional view of a fan blade, in accordance with various embodiments.
Figure 5C:
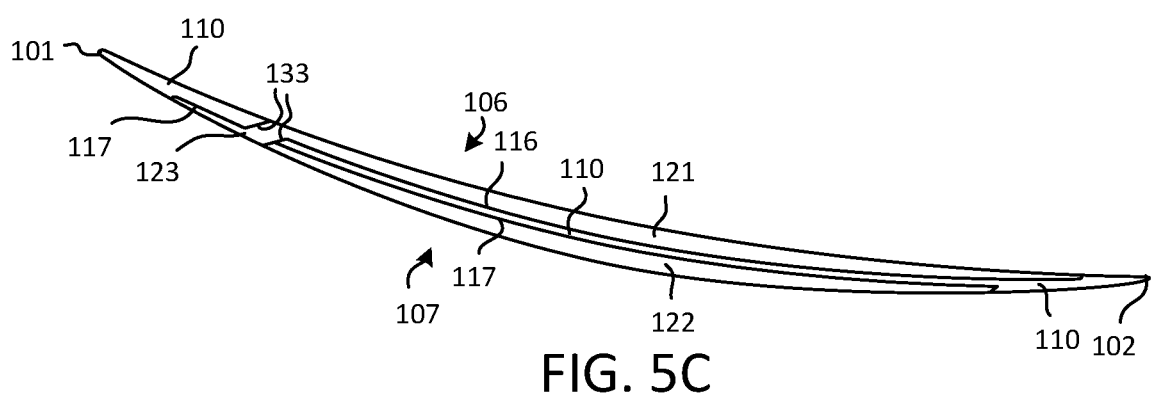
FIG. 5C illustrates a cross-sectional view of a fan blade, in accordance with various embodiments.

FIG. 5A-5C illustrate various cross-sectional views of the fan blade 100, in accordance with various embodiments. As used throughout the present disclosure, the term "composite cover" 120 may refer to the composite material that partially covers the first side 116 and partially covers the second side 117 of the metallic body 110. In various embodiments, the portion of the composite cover 120 that is disposed on the first side 116 of the metallic body 110 may be referred to as the first composite cover 121 and the portion of the composite cover 120 that is disposed on the second side 117 of the metallic body 110 may be referred to as the second composite cover 122. Accordingly, the first composite cover 121 and the second composite cover 122, together with associated portions of the metallic body 110, may form a continuous concave pressure surface 106 and a continuous convex suction surface 107 (e.g., convex side), respectively. In other words, the slots 130 are not apparent and there are no abrupt projections or depressions on the continuous concave pressure surface 106 and the continuous convex suction surface 107. In various embodiments, the first and second composite covers 121, 122 may be different materials.

In various embodiments, the retention slots 130 may comprise first retention slots 133 and second retention slots 134. Also, in various embodiments the first composite cover 121 may include a plurality of first fingers 123 and the second composite cover 122 may include a plurality of second fingers 124. In various embodiments, the first fingers 123 of the first composite cover 121 may extend into the first retention slots 133 to improve the coupling between the first composite cover 121 and the metallic body 110. In a similar fashion, the second fingers 124 of the second composite cover 122 may extend into the second retention slots 134 to improve the coupling between the second composite cover 122 and the metallic body 110. In various embodiments, the respective fingers 123, 124 may extend completely through the respective slots 133, 134 and may engage and be directly coupled to the opposite side 116, 117 of the metallic body 110. That is, in various embodiments, the first fingers 123 may extend from the first composite cover 121 attached to the first side 116 through the first retention slots 133 and may bend to be directly coupled to and engaged with the second side 117 of the metallic body 110. In various embodiments, the second fingers 124 of the second composite cover 122 may have an analogous configuration. That is, the second fingers 124 may extend through the second retention slots 134 and may be directly coupled to an engaged with the first side 116 of the metallic body 110.

In various embodiments, a series of retention slots 130, for example the leading edge retention slots 131, as shown in FIG. 3, may alternate between first retention slots 133 and second retention slots 134. Said differently, each of the retention slots 130 may be designated as either a first retention slot 133 or a second retention slot 134 depending on which finger 123, 124 extends through each slot. Thus, slots through which a first finger 123 of the first composite cover 121 extends is referred to as a first retention slot 133 and slots through which a second finger 124 of the second composite cover 122 extends is referred to as a second retention slot 134. The relative arrangement, distribution, number, and configuration of the first and second retention slots 133, 134 may be dependent on a specific application, in accordance with various embodiments. For example, in various embodiments the leading edge retention slots 131 that are closest to the tip 103 of the fan blade 100 may be first retention slots 133 while the remaining leading edge retention slots 131 that are comparatively closer to the hub end 104 of the fan blade 100 may be second retention slots 134.

Figure 6:
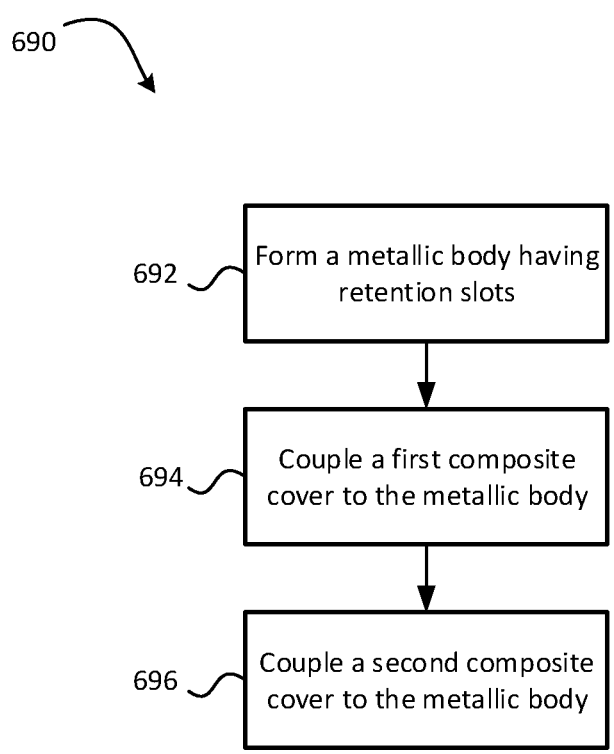
FIG. 6 is a schematic flowchart diagram of a method of manufacturing a fan blade, in accordance with various embodiments.

FIG. 6 is a schematic flowchart diagram of a method 690 of manufacturing the fan blade 100, according to various embodiments. The method 690 may include, in various embodiments, forming the metallic body 110 with retention slots 130 at step 692. In various embodiments, the method 690 may further include coupling the first composite cover 121 to the first side 116 of the metallic body 110 at step 694 and coupling the second composite cover 122 to the second side 117 of the metallic body 110 at step 696. In various embodiments, steps 694 and 696 may include and/or involve adhesively bonding the first composite cover 121 to the first side 116 of the metallic body 110 and adhesively bonding the second composite cover 122 to the second side 117 of the metallic body 110. In various embodiments, the first and second composite covers 121, 122 may be made from uncured plies and steps 694 and 696 may include curing the plies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan blade comprising:
   a metallic body comprising a first side, a second side, a plurality of first retention slots, and a plurality of second retention slots, wherein the first and second retention slots extend from the first side to the second side of the metallic body;
   a first composite cover coupled to the first side of the metallic body, wherein the first composite cover comprises a plurality of first fingers that extend through the first retention slots and are coupled to the second side of the metallic body; and
   a second composite cover coupled to the second side of the metallic body, wherein the second composite cover comprises a plurality of second fingers that extend through the second retention slots and are coupled to the first side of the metallic body.

2. The fan blade of claim 1, wherein the metallic body is made from titanium.

3. The fan blade of claim 1, wherein the first and second composite covers are made from a graphite epoxy material.

4. The fan blade of claim 1, wherein the first composite cover is made from a first composite material and the second composite cover is made from a second composite material that is different than the first composite material.

5. The fan blade of claim 1, wherein the first side of the metallic body is concave and the second side of the metallic body is convex.

6. The fan blade of claim 5, wherein the first composite cover and the second fingers form a continuous pressure surface of the fan blade and the second composite cover and the first fingers form a continuous suction surface of the fan blade.

7. The fan blade of claim 1, wherein a leading edge, a trailing edge, and a tip of the fan blade are uncovered with the first and second composite covers.

8. The fan blade of claim 1, wherein the first and second retention slots collectively form a series of leading edge slots and a series of trailing edge slots, wherein the leading edge slots are disposed between a central axis of the fan blade and a leading edge of the fan blade and the trailing edge slots are disposed between the central axis of the fan blade and a trailing edge of the fan blade.

9. The fan blade of claim 8, wherein the leading edge slots alternate between the first and second slots and the trailing edge slots alternate between the first and second slots.

10. The fan blade of claim 8, wherein the leading edge slots are positioned to follow a shape of the leading edge and the trailing edge slots are positioned to follow a shape of the trailing edge.

11. The fan blade of claim 8, further comprising intermediate slots disposed between the leading edge slots and the trailing edge slots.

12. The fan blade of claim 1, wherein the plurality of first retention slots and the plurality of second retention slots are pass-through slots that extend completely through the metallic body.

13. A method of manufacturing a fan blade, the method comprising:

forming a metallic body of the fan blade having a plurality of first retention slots and a plurality of second retention slots, wherein the plurality of first retention slots and the plurality of second retention slots are pass-through slots that extend completely through the metallic body;

coupling a first composite cover to a first side of the metallic body such that a plurality of first fingers of the first composite cover extend through the first retention slots; and coupling a second composite cover to a second side of the metallic body such that a plurality of second fingers of the second composite cover extend through the second retention slots.

14. The method of claim 13, wherein coupling the first composite cover to the first side of the metallic body and coupling the second composite cover to the second side of the metallic body comprises adhesive bonding.

15. The method of claim 13, wherein coupling the first composite cover to the first side of the metallic body and coupling the second composite cover to the second side of the metallic body comprises curing plies.

\* \* \* \* \*